US007681739B2

(12) United States Patent
Lang et al.

(10) Patent No.: US 7,681,739 B2
(45) Date of Patent: Mar. 23, 2010

(54) FILTER DEVICE

(75) Inventors: Norbert Lang, Blieskastel (DE); Jürgen Hausdorf, Saarbrücken (DE); Ralf Wnuk, Bexbach (DE)

(73) Assignee: Hydac Process Technology GmbH, Neunkirchen (DE)

( * ) Notice: Subject to any disclaimer, the term of this patent is extended or adjusted under 35 U.S.C. 154(b) by 77 days.

(21) Appl. No.: 10/169,025

(22) PCT Filed: Jan. 3, 2001

(86) PCT No.: PCT/EP01/00010

§ 371 (c)(1),
(2), (4) Date: Jun. 27, 2002

(87) PCT Pub. No.: WO01/52966

PCT Pub. Date: Jul. 26, 2001

(65) Prior Publication Data

US 2002/0189993 A1    Dec. 19, 2002

(30) Foreign Application Priority Data

Jan. 19, 2000   (DE) ................................. 100 01 907

(51) Int. Cl.
*B01D 29/15* (2006.01)
(52) U.S. Cl. ................... 210/446; 210/456; 210/497.3
(58) Field of Classification Search ................ 210/446, 210/449, 457, 489, 497.3, 448, 456, 499, 210/438, 441; 425/197–199; 55/521
See application file for complete search history.

(56) References Cited

U.S. PATENT DOCUMENTS

| 1,638,066 | A | * | 8/1927 | Smythe ....................... 210/438 |
| 2,488,595 | A | * | 11/1949 | Henning ...................... 425/199 |
| 3,187,895 | A | * | 6/1965 | Pall et al. .................... 210/114 |
| 3,817,377 | A |   | 6/1974 | Piggott |
| 4,043,918 | A |   | 8/1977 | Orona |
| 4,052,315 | A |   | 10/1977 | Lindsay, Jr. et al. |
| 4,169,795 | A |   | 10/1979 | Raines |
| 4,453,905 | A | * | 6/1984 | Bennett ................... 425/192 R |
| 4,964,984 | A |   | 10/1990 | Reeder et al. |
| 5,578,208 | A | * | 11/1996 | Miki et al. .................. 210/487 |

FOREIGN PATENT DOCUMENTS

| GB | 2075364 | 11/1981 |
| WO | 9000434 | 1/1990 |

* cited by examiner

*Primary Examiner*—Matthew O Savage
(74) *Attorney, Agent, or Firm*—Roylance, Abrams, Berdo & Goodman, L.L.P.

(57) ABSTRACT

A filter device includes a filter housing (10), a filter inlet (12), a filter outlet (14), and a filter element (16). The filter element divides a filter area (18) into two partial areas (20, 22). One partial filter areas is conical in form with the cross-section of that partial area (20) being tapered from the filter inlet (12) to the filter outlet (14). The partial areas are separated from each other by the filter element. This arrangement results in an optimum residence time distribution inside the filter device at a uniform flow rate, which is particularly useful for highly viscous fluids such as polymer melts or similar.

22 Claims, 1 Drawing Sheet

FILTER DEVICE

FIELD OF THE INVENTION

The present invention relates to a filter device with a filter housing having an inlet, an outlet and a conical filter element subdividing the filter space into two subspaces.

BACKGROUND OF THE INVENTION

Filter devices, such as those disclosed in U.S. Pat. Nos. 4,964,984, 4,169,795, 4,052,315, 4,043,918, and in GB 2 075 364), are readily obtainable on the market in a multiplicity of embodiments. The structure of the filter elements, which filter impurities out of a fluid, is determined by the manufacturer. Filter elements of higher quality have a multilayer meshed structure which may rest at least on one supporting fabric to enable the structure to resist higher pressure or pressure peaks.

In principle, it is desirable to arrive at uniform flow behavior inside the filter space during the filtration process, while avoiding dead spaces. The requirements set for the desired behavior increase as the viscosity of the fluid increases, especially if liquefied polymer materials or polymer solutions are to be filtered.

U.S. Pat. No. 3,817,377 discloses a generic filter device, in particular one for separation of impurities from hot thermoplastic polymer material. In one embodiment of the conventional filter device shown in FIGS. 4 and 5 of that patent, a conical filter element subdivides a conical filter space into two conical subspaces. The conicities of the two subspaces extend constantly in opposite directions but to different extents, that is, with different cross-sections relative to one point of reference. The diameter of the filter element is measured from the filter outlet in the direction of the filter inlet more or less constantly. The resulting conicity of the filter element is referred to the longitudinal direction of the filter outlet. The bounding walls following the subspaces as housing elements have a conical orientation comparable to that of the filter element, so that the conventional solution applied for this purpose is complex in structure. Control of flow, which is unfavorable from the viewpoint of energy, is obtained because of the different cross-sectional patterns referred to one point of comparison, especially in the case of high-viscosity fluids.

SUMMARY OF THE INVENTION

Objects of the present invention are to provide filter devices with improved filter operation from the viewpoint of energy consumption.

According to the present invention, narrowing of the cross-section of one of the two subspaces occurs to the same extent as does widening of the cross-section of the other subspace. One of the subspaces extends outward toward the exterior. The other subspace extends inward toward the center of the filter device. Each subspace is bounded by a cylindrical wall. The filter element narrows conically in the direction from the filter outlet to the filter inlet. Because of the equally varying cross-sections and volumes of the two subspaces, an optimal dwell time distribution is achieved, along with uniform rate of flow of fluid of especially high viscosity, such as one in the form of liquefied polymer material or a polymer solution. Also, in filtering operation, dead spaces inside the filter housing may be prevented and uniform distribution of the mass to be filtered is provided. This arrangement results in filtration operation with acceptable energy costs and in cost reduction.

In addition, the fluid to be filtered expands from a narrow cross-section toward a wide cross-section and, conversely, from a wide subspace into a subspace with correspondingly narrowed cross-section.

To obtain conical subspaces, the filter element itself is conical in form and tapers from the filter outlet in the direction of the filter inlet. Accordingly, as viewed in the fluid or filter direction, the subspace with the cross-section tapering toward the filter outlet is mounted upstream from the filter element. The other subspace with the widening cross-section is downstream of the filter element. Preferably, the filter element has a supporting tube. The filter material is mounted on the supporting tube so as to be replaceable. The support tube ensures that the filter element is able to perform its function when subjected to high pressures. The replaceability allows the filter element material, once depleted, to be replaced with new material without making complete replacement of the filter element plus supporting tube necessary. The filter housing is preferably cylindrical in form, at least in the area of the filter element.

In an especially preferred embodiment of the filter device of the present invention, the filter inlet and outlet have cross-sections open in the direction of the filter space so that uniform distribution of the fluid to be filtered is also ensured in these locations. The filter housing, the filter inlet and outlet, and the filter element with supporting tube and filter material are preferably formed of special steel materials.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
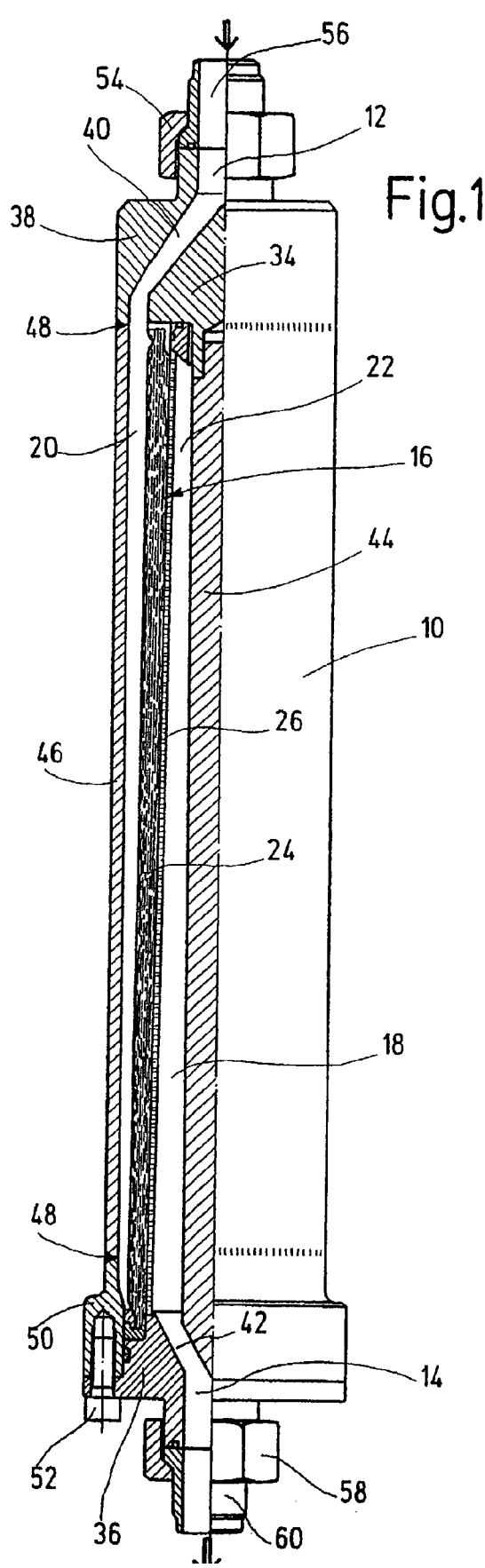
FIG. 1 is an elevational side view, partly in section, of a filter device according to an embodiment of the present invention.

The filter device, essentially cylindrical as a whole, has a filter housing 10 and filter inlet 12 and filter outlet 14. A filter element 16 as a whole is mounted inside the filter housing 10. This element subdivides a filter space 18 into a first subspace 20 and a second subspace 22. The first subspace 20 tapers, as is shown in FIG. 1 in particular, from the filter inlet 12 to the filter outlet 14 in free cross-section. The second subspace 22 on the other hand, widens from the filter inlet 12 to the filter outlet 14 in cross-section. The tapering of one subspace 20 in cross-section proceeds to the same extent and steadily as does widening of the other subspace 22 in cross-section. Hence, the two subspaces 20 and 22 are juxtaposed so as to be conical in form. In addition, the subspaces 20 and 22 form closed ring-shaped chamber structures inside the filter device.

The filter element 16, which itself is conical in shape and tapers conically from filter outlet 14 to filter inlet 12, is used to create the conicity in the subspaces 20 and 22.

Figure 3:
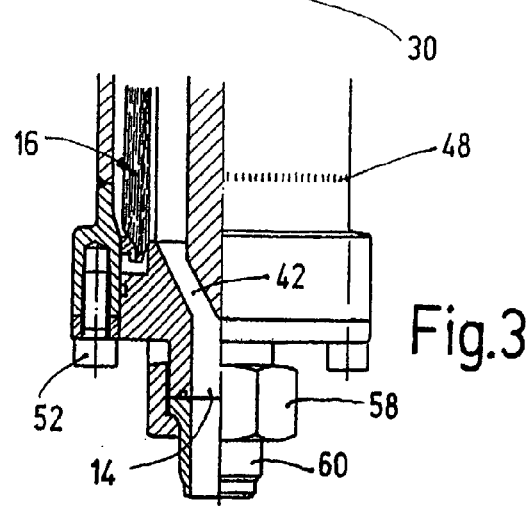
FIG. 3 is an enlarged partial side elevational view, partly in section, of the lower connection area of the filter device of FIG. 1.

The filter element 16 has meshed filter material 24, the inner circumference of which rests against a supporting tube 26 with fluid passages. The filter material 24 surrounds the outer circumference of the supporting tube 26, and is applied around the supporting tube 26 as a filter mesh. The filter housing 10, on the other hand, is cylindrical in shape in the area into which the filter element 16 is introduced. As seen in FIGS. 1 and 3 for the lower area, the filter inlet 12 and the filter outlet 14 have opening cross-sections to the filter space 18 which are free so that a uniform distribution of the rate of movement of the fluid to be filtered, especially fluid in high-viscosity form such as liquefied polymer material or a polymer solution, is ensured. In the last-named case, the filter housing 10, the filter inlet 12, and the filter outlet 14, as well as the filter element 16 with supporting tube 26 and filter material 24, are made of special steel material.

Figure 2:
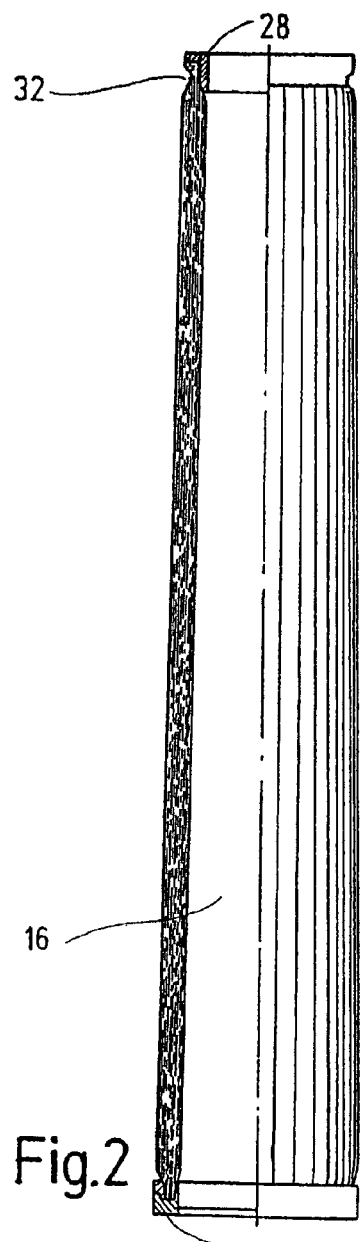
FIG. 2 is a side elevational view, partly in section of the filter element illustrated in FIG. 1.

As the illustration in FIG. 2 shows, the filter element 16 may also be constructed without a supporting tube 26, and the filter material 24 in the form of a special steel mesh is introduced so as to be self-supporting between end caps 28 and 30. As viewed in the figures, in the area of the upper end cap 28 the free end of the hollow cylindrical filter material 24 is bent inward to form a point of application 32 on the upper end cap 28. The end caps 28 and 30 are rigidly connected to the filter material 24 and may be pulled away with it, to the extent it is present, from the supporting tube 26 and disposed of separately, if the degree of fouling makes this necessary. New, unused filter material 24 with corresponding end caps 28, is then forced onto the supporting tube 26 or is inserted together with it into the filter device as a component.

As FIG. 1 also shows, the filter element 16 is fixed in place between an upper receptacle element 34 and a lower receptacle element 36. On its free end, the upper receptacle element 34 has a conical guide cone which, together with the upper cover element 38 of the filter housing 10, delimits a fluid channel 40. Channel 40 forms a circulating ring channel and is configured in its cross-sectional form, as illustrated, to provide a uniform inflow of the high-viscosity into the first subspace 20. For this purpose, the fluid channel 40 narrows toward its free frontal end where it discharges into the first subspace 20, opposite the entry point extending in the same form at the fluid inlet 12. The direction of delivery of the fluid is indicated by an arrow in FIG. 1. The direction of drainage at the filter outlet 14 is also indicated by an arrow.

The fluid flowing through the filter device in the direction of the arrow, which is charged with fouling on the filter inlet 12 side, passes through the fluid channel 40 into the first conical subspace 20 and fills this subspace so that there is no dead space. In the event of a uniform dwell time in the first subspace 20, the fouled fluid passes evenly and constantly through the filter material 24 and is there suitably filtered clean. The cleaned fluid then passes through the free passage points of the supporting tube 26 into the second subspace 22 and the other fluid channel 42 on the filter outlet 14 from the filter device, now cleaned. As regards the double conicity of the two subspaces 20, 22 mounted so as to extend in opposite directions, it is characterized by uniform rate of flow, so that optimal dwell time distribution over the filter element is ensured.

Inside the filter device upper receptacle element 34 rests on a rod-shaped filter element 44, which preferably is also is made of special steel material. The filter element 44 may also be guided or extended inside the filter device by the receptacle element 34, and fixed in position inside the filter device. The filter housing 10 has a cylindrical central housing section 46 rigidly connected to the upper cover element 38 and the lower cover element 50 by weld joints 48 on the edge. The lower cover element 50 holds the lower receptacle element 36 on the filter housing 10 in place by screw connection 52, thereby immobilizing the filter element 16 inside the filter space 18 as a whole. The upper cover element 38, as viewed in the direction of FIG. 1, narrows in diameter upward and forms a connection point for a swivel nut 54 by which a feed connection piece 56 for delivery of liquefied polymer material may be connected. On the opposite end of the filter device, a corresponding swivel nut 58 is provided by which a drain connection piece 60 for discharge of the filtered fluid in the form of purified liquefied polymer material is connected to the filter device. A corresponding threaded section (not shown) facilitates the pertinent fastening.

Loosening of the screw connection 52, which comprises several fastening screws mounted radially over the circumference of the filter device, permits detachment of the lower receptacle element 36 and removal of the filter material 24 with and without supporting tube 26. Filter element replacement can thus be carried out quickly. The filter element 16 and the filter material 24, as well as the two subspaces 20, 22 as thus conditioned, exhibit only slight conicity, for example, in the form of inclination relative to the horizontal and/or in the transverse direction of the filter device of the order of magnitude of 1° to 5°.

While one embodiment has been chosen to illustrate the invention, it will be understood by those skilled in the art that various changes and modifications can be made therein without departing from the scope of the invention as defined in the appended claims.

The invention claimed is:

1. A filter device comprising:
   a filter housing with a filter inlet and a filter outlet at opposite ends thereof and with an inside filter space; and
   a conical filter element subdividing said filter space into first and second subspaces arranged sequentially from said filter inlet to said filter outlet, said first subspace tapering conically in transverse cross-section from said filter inlet to said filter outlet, said second subspace widening conically in transverse cross-section from said filter inlet to said filter outlet to provide a uniform flow rate in said first and second subspaces, said subspaces having respective conicities proceeding constantly in opposite directions, tapering of said first subspace and widening of said second subspace occurring to substantially equal extents in that said first subspace extends outwardly and the second subspace extends toward a center of said filter housing with each subspace being bounded opposite said filter element by a cylindrical wall, said filter element narrowing conically from said filter outlet toward said filter inlet.

2. A filter device according to claim 1 wherein
   said cylindrical wall bounding said first subspace forms said filter housing; and
   said cylindrical wall bounding said second subspace comprises a rod-shaped filter element extending along a central axis of and inside of said filter housing.

3. A filter device according to claim 1 wherein
   said filter element comprises a supporting tube and filter material releasably coupled to said supporting tube so as to be replaceable.

4. A filter device according to claim 3 wherein
   said filter housing, said filter inlet, said filter outlet, said supporting tube and said filter material are formed of steel material.

5. A filter device according to claim 1 wherein
   said filter housing is cylindrical in an area thereof receiving said filter element.

6. A filter device according to claim 1 wherein
said filter inlet and said filter outlet have open cross-sections toward said filter space ensuring a uniform flow rate of fluid to be filtered.
7. A filter device according to claim 6 wherein
the fluid to be filtered has a high viscosity.
8. A filter device according to claim 7 wherein
the fluid to be filtered is liquified polymer material or a polymer solution.
9. A filter device according to claim 3 wherein
said filter housing, said filter inlet, said filter outlet and said filter element are formed of steel.
10. A filter device according to claim 1 wherein
said subspaces extend substantially along a full length of said housing between said filter inlet and said filter outlet, and are of substantially equal length.
11. A filter device according to claim 10 wherein
said first and second subspaces substantially taper and widen, respectively, along substantially said full lengths thereof.
12. A filter device, comprising:
a filter housing with a filter inlet and a filter outlet at opposite ends thereof and with an inside filter space; and
a conical filter element subdividing said filter space into first and second subspaces arranged sequentially from said filter inlet to said filter outlet, said first subspace tapering conically in transverse cross-section from said filter inlet to said filter outlet, said second subspace widening conically in transverse cross-section from said filter inlet to said filter outlet for a uniform rate of flow therein to optimize dwell time distribution over said filter element, said subspaces having respective conicities proceeding constantly in opposite directions, tapering of said first subspace and widening of said second subspace occurring to equal extents in that said first subspace extends outwardly and the second subspace extends toward a center of said filter housing with each subspace being bounded opposite said filter element by a cylindrical wall, said filter element narrowing conically from said filter outlet toward said filter inlet.
13. A filter device according to claim 12 wherein
said cylindrical wall bounding said first subspace forms said filter housing; and
said cylindrical wall bounding said second subspace comprises a rod-shaped filter element extending along a central axis of and inside of said filter housing.
14. A filter device according to claim 12 wherein
said filter element comprises a supporting tube and filter material releasably coupled to said supporting tube so as to be replaceable.
15. A filter device according to claim 14 wherein
said filter housing, said filter inlet, said filter outlet, said supporting tube and said filter material are formed of steel material.
16. A filter device according to claim 12 wherein
said filter housing is cylindrical in an area thereof receiving said filter element.
17. A filter device according to claim 12 wherein
said filter inlet and said filter outlet have open cross-sections toward said filter space ensuring a uniform flow rate of fluid to be filtered.
18. A filter device according to claim 17 wherein
the fluid to be filtered has a high viscosity.
19. A filter device according to claim 18 wherein
the fluid to be filtered is liquified polymer material or a polymer solution.
20. A filter device according to claim 12 wherein
said filter housing, said filter inlet, said filter outlet and said filter element are formed of steel.
21. A filter device according to claim 12 wherein
said subspaces extend substantially along a full length of said housing between said filter inlet and said filter outlet, and are substantially of equal length.
22. A filter device according to claim 21 wherein
said first and second subspaces substantially taper and widen, respectively, along substantially said full lengths thereof.

* * * * *